United States Patent [19]

Rohrs et al.

[11] 4,124,130

[45] Nov. 7, 1978

[54] SAFETY BARRIER FOR A WHEELCHAIR LIFT

[75] Inventors: Donald L. Rohrs; Donald L. Collins; Harold A. Downing, all of Hutchinson, Kans.

[73] Assignee: Collins Industries, Inc., Hutchinson, Kans.

[21] Appl. No.: 773,075

[22] Filed: Feb. 28, 1977

[51] Int. Cl.[2] .............................................. B60R 3/02

[52] U.S. Cl. ................................ 214/75 R; 187/8.52; 214/77 P; 214/DIG. 13

[58] Field of Search ................ 214/77 R, 77 P, 75 R, 214/DIG. 13, 75 T; 187/8.52

[56] References Cited

U.S. PATENT DOCUMENTS

| | | | |
|---|---|---|---|
| 1,946,320 | 2/1934 | Hollister | 187/8.52 |
| 1,955,586 | 4/1934 | Hott et al. | 187/8.52 |
| 2,066,916 | 1/1937 | Thompson | 187/8.52 |
| 3,458,013 | 7/1969 | Haynes | 187/8.52 |
| 3,764,030 | 10/1973 | Randall | 214/77 P |
| 3,913,759 | 10/1975 | Deacon | 214/77 R |
| 4,027,807 | 6/1977 | Thorley | 214/DIG. 13 |

*Primary Examiner*—L. J. Paperner
*Assistant Examiner*—Ross Weaver
*Attorney, Agent, or Firm*—Edwin H. Crabtree

[57] ABSTRACT

A safety barrier for a wheelchair lift. The barrier preventing a wheelchair from dropping off the lift as the lift is raised and lowered horizontally from a vehicle to the ground surface. The barrier automatically lowers when the lift contacts the ground surface so that the wheelchair may be discharged from the lift.

3 Claims, 6 Drawing Figures

SAFETY BARRIER FOR A WHEELCHAIR LIFT

BACKGROUND OF THE INVENTION

This invention relates generally to a stop or barrier mounted on a lift and more particularly, but not by way of limitation, to a barrier for mounting on a horizontal wheelchair lift attached to the side of a vehicle.

Heretofore, there have been various types of lifts and ramps which are folded into a vehicle or aircraft. In particular, there are wheelchair lifts that are folded vertically into an opening in the vehicle. The lift is lowered from the vehicle to a horizontal position and adjacent the opening in the vehicle. The wheelchair and occupant are then wheeled onto the lift and the lift is lowered to the ground surface.

While prior art lifts and ramps have used various types of mechanical cable driven or hydraulically driven stops or plates attached to the sides of the lifts and ramps to prevent an object from rolling off, none of the prior art devices provide a safety barrier which is mounted at the front of the lift to prevent the object from dropping off the lift and automatically lowers when the lift contacts the ground surface so that the object may be unloaded from the lift.

Also, none of the prior art stop or barriers have included a lock for securing the safety barrier when it is in operation and automatically releasing the barrier when the lift contacts the ground surface.

SUMMARY OF THE INVENTION

The safety barrier for a wheelchair lift prevents a wheelchair from dropping off the lift when the lift is in use.

The barrier is held in a locked vertical position during the use of the lift and is not released until the lift contacts the ground surface.

The safety barrier automatically lowers from a vertical position to a horizontal position when the lift contacts the ground surface. The barrier also automatically raises to a vertical position and is locked therein when the lift is raised from the ground surface.

The safety barrier for a wheelchair lift includes an elongated stop plate pivotally mounted on the front of the lift. A first and second pivot arm are pivotally attached to the side of the lift with the first pivot arm pivotally attached to one end of a horizontal transfer bar. The other end of the transfer bar is pivotally attached to the stop plate. A rod guide is attached to the side of the lift. One end of a rod is pivotally attached to the first pivot arm. The other end of a rod is received through an aperture in the rod guide. A spring is disposed around the rod for biasing the stop plate into a vertical position. The stop plate is held in this position by a lock bar which is pivotally attached to the stop plate and releasably engaged to the transfer bar. The stop plate is automatically lowered into a horizontal position by an elongated horizontal shoe which is attached to the pivot arms. The shoe extends downwardly below the horizontal surface of the lift for contacting the ground surface when the lift is lowered and coacts with the pivot arms, transfer bar, and lock bar in lowering the stop plate to a horizontal position for unloading the lift.

The advantages and objects of the invention will become evident from the following detailed description when read in conjunction with the accompanying drawings which illustrate the preferred embodiments of the invention.

BRIEF DESCRIPTION OF THE DRAWINGS

FIG. 6 is an enlarged side view of the safety barrier with the stop plate in a horizontal position.

DETAILED DESCRIPTION OF THE DRAWINGS

Figure 1:
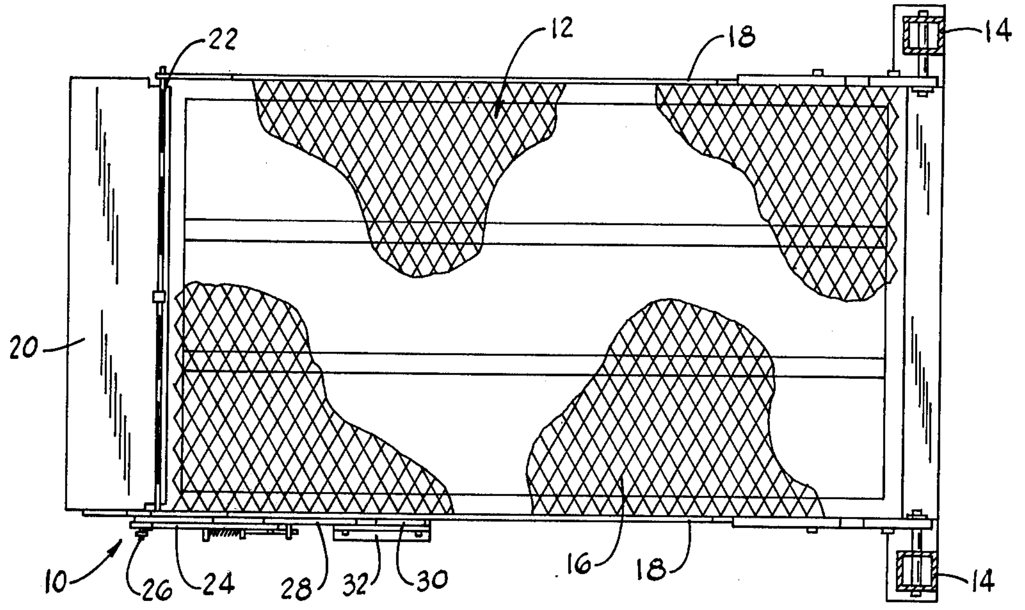
FIG. 1 is a top view of the saftey barrier mounted on the front of the wheelchair lift.

In FIG. 1, a top view of the safety barrier is shown and designated by general reference numeral 10. The barrier 10 is pivotally mounted on the front of a horizontal lift 12. The rear of the lift 12 is attached to a pair of lift arms 14, which are used to raise and lower the lift 12 horizontally. The arms 14 extend outwardly from an opening in the side or rear of a vehicle. While the lift 12 is discussed for raising and lowering a wheelchair from the vehicle to the ground surface, it should be understood that the barrier 10 can be used equally well on a variety of horizontally mounted lifts or ramps used for loading and unloading various types of material and objects. The vehicle and the wheelchair are not shown in the drawings.

The lift 12 further includes a metal mesh floor 16 with vertical sides 18 which extend upward from the floor 16 so that the wheelchair can not roll off the sides of the lift 12. The rear of the lift 12 does not include a stop or barrier since the lift is adjacent the side or rear of the vehicle which would act as a natural barrier to prevent the wheelchair from rolling off the lift 12.

The barrier 10 includes a stop plate 20 which when in use is raised to a vertical position extending above the horizontal plane of the floor 16 to prevent the wheelchair from rolling off the front of the lift 12. In FIG. 1, the stop plate 20 is illustrated in a down or horizontal position which would be the normal position for loading or unloading the wheelchair from the lift 12. In this position, the plate 20 is adjacent and parallel the plane of the floor 16.

The stop plate 20 is pivotally attached to the sides 18 by an elongated pivot rod 22. The ends of the pivot rod 22 extend through the ends of the sides 18 and are pinned thereon. The stop plate 20 is also pivotally attached at one end to a horizontal transfer bar 24 by a stop pin 26. The transfer bar 24 is disposed adjacent to and parallel one of the sides 18 of the lift 12. The other end of the transfer bar 24 is pivotally attached by a pin 27 to a first pivot arm 28 which extends downwardly from the bar 24. The first pivot arm 28 and a second pivot arm 30 are pivotally attached to the side 18 of the lift 12 by pins 31 and 33. The lower ends of the arms 28 and 30 are pivotally attached by pins 35 and 37 to a horizontal shoe 32 which is disposed below the bottom of the horizontal floor 16 and parallel thereto. The above described structure is discussed under FIGS. 5 and 6 and seen more clearly in these illustration.

Figure 2:
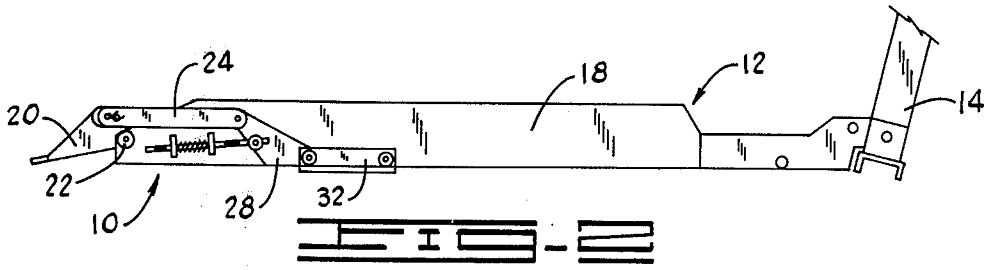
FIG. 2 is a side view of the safety barrier and wheelchair lift with the safety plate in a horizontal position.

In FIG. 2 a side view of the barrier 10 and lift 12 is shown. In this illustration, the stop plate 20 can be seen in a horizontal position for loading and unloading the lift 12. The shoe 32 is in a raised position and held in this position by the ground surface, curb, loading dock, or any other surface in which the lift 12 would be lowered on.

Figure 3:
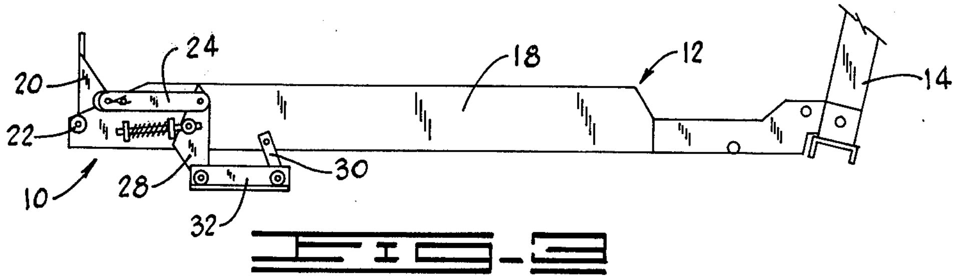
FIG. 3 is a side view of the safely barrier with the stop plate in a vertical position.

In FIG. 3, a similar side view of the barrier 10 and lift 12 is illustrated except the stop plate 20 is in a vertical position extending upwardly from the floor 16 to prevent the wheelchair from rolling off the floor of the lift 12. The lift 12 has been raised from the ground surface and the shoe 32 biased downwardly.

Figure 4:
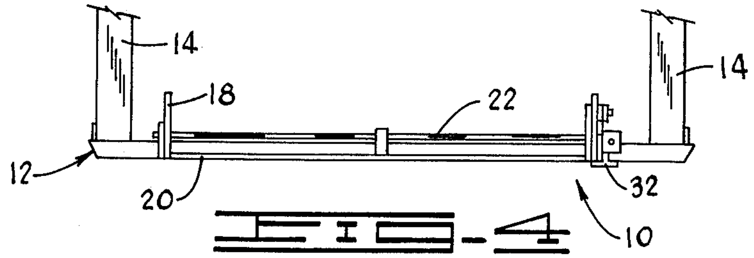
FIG. 4 is a front view of the safety barrier with the stop plate in a horizontal position.

In FIG. 4, a front view of the barrier 10 and lift 12 is shown. In this view, the stop plate 20 is again shown in a horizontal position for loading and unloading the wheelchair on the lift 12.

Figure 5:
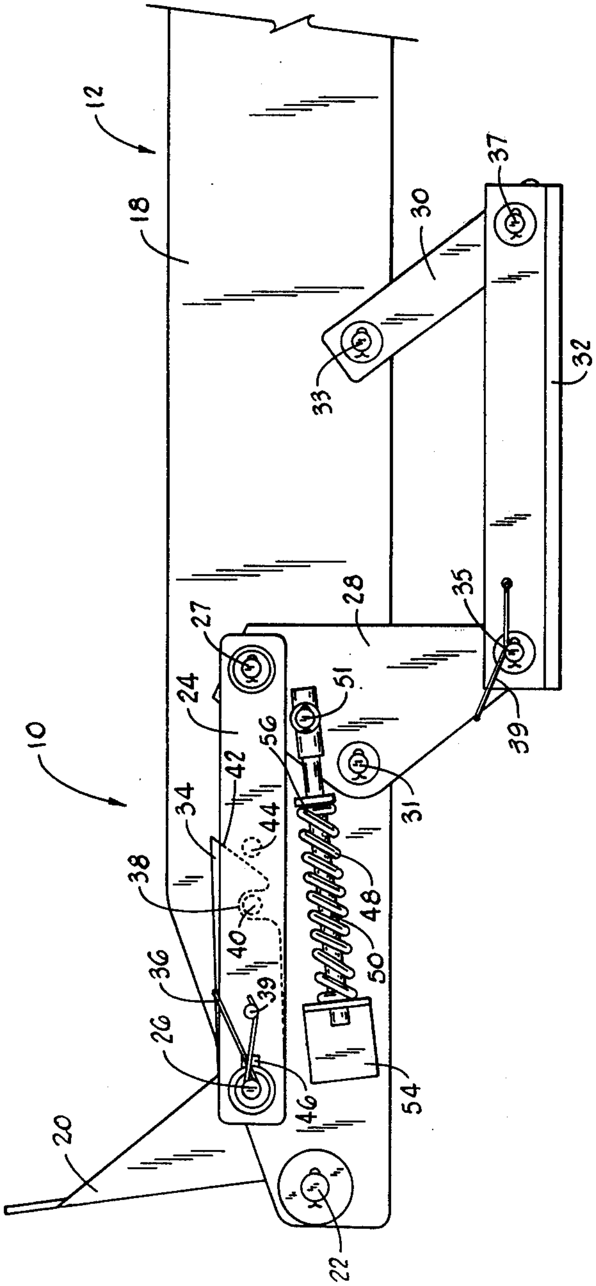
FIG. 5 is an enlarged side view of the safety barrier with the stop plate in a vertical position.
Figure 5:
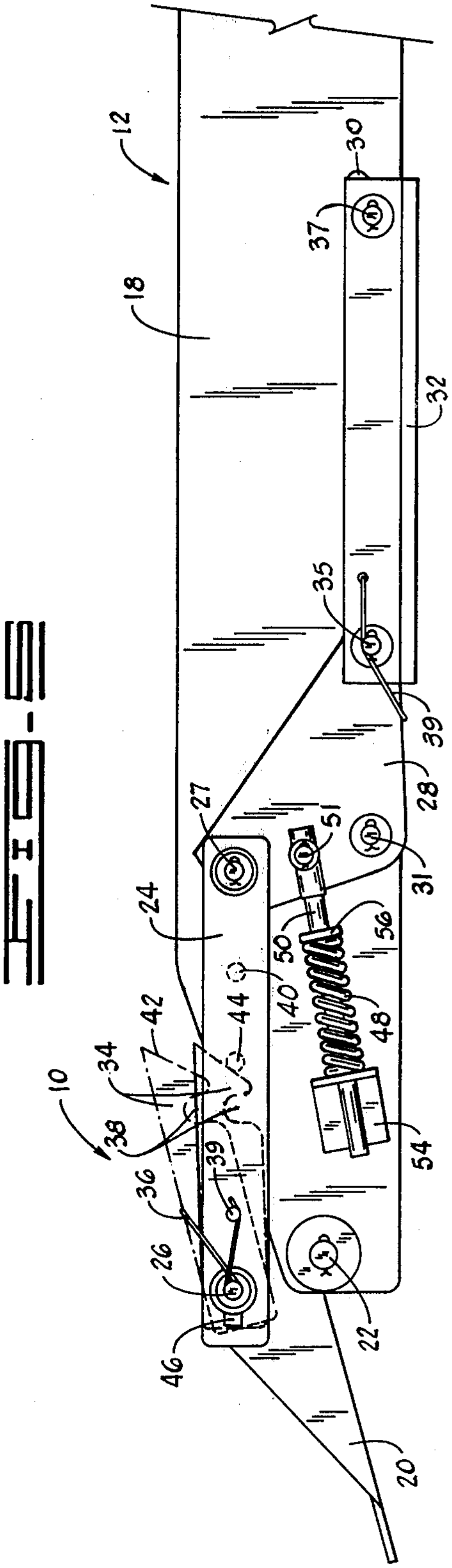

In FIG. 5, a side view of the barrier 10 is illustrated showing in greater detail the combined structure of the invention. In this view, the stop plate 20 is in a vertical position. The stop plate 20 is held in this position by a lock bar 34. The lock bar 34 is pivotally attached at one end to the stop pin 26 and is biased in a clockwise direction by a stop pin spring 36. The stop pin spring 36 is disposed around the stop pin 26 and has one end secured to a pin 39 and the other end biased on top of the bar 34. The lock bar 34 includes a "U" shaped indent 38 in its lower portion for engagably receiving a lock pin 40. The lock pin 40 is attached to one of the sides 18 of the floor 16 and extends outwardly therefrom. The lock bar 34 further includes a cam surface 42 at one end thereof which is disposed adjacent a cam pin 44. The cam pin 44 is attached to the side of the transfer bar 24. The cam pin 44 engages the cam surface 42 at the end of the lock bar 34 for urging the lock bar 34 upwardly in a counter clockwise direction for releasing the lock pin 40 from the indent 38. The lock pin 40, cam pin 44, indent 38, and cam surface 42 are shown in dotted lines and are disposed between the transfer bar 24 and side 18. The transfer bar 24 further includes an elongated slot 46 for receiving the stop pin 26. The slot 46 allows the transfer bar 24 to move horizontally to the left allowing the cam pin 44 to engage the cam surface 42 and release the bar 24 from the lock pin 40 prior to the transfer bar 24 engaging the stop pin 26 and pivoting the stop plate 20 downwardly.

The stop plate 20 is biased in a vertical position by a coil spring 48 disposed around a rod 50. One end of the rod 50 is pivotally attached by a pin 51 to the first pivot arm 28 for pivoting the first pivot arm 28 in a clockwise direction, thereby urging the transfer bar 24 horizontally to the right and rotating the stop plate 20 upwardly into a vertical position. The other end of rod 50 extends through an aperture in a rod guide 54 for holding the rod 50 in place against the side 18. The spring 48 is retained on the rod 50 between the rod guide 54 and an annular flange 56 disposed around the rod 50.

The spring 48 by biasing the first pivot arm 28 in a clockwise direction pivots the horizontal shoe 32 pivotally attached to the arms 28 and 30 downwardly to a position below and parallel to the lift 12.

In FIG. 6, the stop plate 20 has been lowered so that the wheelchair may be loaded or unloaded from the lift 12. The horizontal shoe 32 has contacted the ground surface and has been raised to a position adjacent the horizontal surface of the floor 16 of the lift 12.

In operation, when the lift 12 is lowered, the horizontal surface of the shoe 32 comes into contact with the ground surface and as the lift 12 continues downward, the shoe 32 pivots upwardly into a counter clockwise direction until the bottom of the floor 16 of the lift 12 rests on top of the ground surface. The shoe 32 is prevented from pivoting above the pivot points of pins 31 and 33 by a spring 39 disposed around pin 35 and attached to arm 28 and the shoe 32.

As the shoe 32 pivots in a counter clockwise direction on the arms 28 and 30, the bias of the spring 48 on the rod 50 is overcome and the spring 48 is compressed between the rod guide 54 and annular flange 56. At the same time, the first pivot arm 28 urges the transfer bar 24 to the left. As the transfer bar 24 moves to the left, the stop pin 26 slides in the slot 46 in the bar 24. Again, at the same time, the cam pin 44 moves to the left and engages the cam surface 42 of the lock bar 34. The engagement on the cam surface 42 moves the lock bar 34 upwardly in a counter clockwise direction until the lock pin 40 is released from the indent 38 in the bar 34. At this point, the lock bar 34 is released from the transfer bar 24 and the stop plate 20 is free to be pivoted downwardly. When the lock bar 34 has been released from the transfer bar 24, the slot 46 has moved its entire length to the left and the transfer bar 46 now engages the stop pin 26. As the trasnfer bar 24 continues to move to the left, the stop pin 26 engaged by the transfer bar 24 pivots the stop plate 20 downwardly until the stop plate 20 is lowered into its horizontal position.

When the lift 12 has been loaded or unloaded and is ready for operation, the lift 12 is raised. As the lift 12 is raised, the pressure applied against the horizontal shoe 32 by the ground surface is relieved, and the spring 48 on the rod 50 urges the rod 50 in a clockwise direction thereby lowering the shoe 32. At the same time, the transfer bar 24 is moved to the right by the first pivot 28. As the transfer bar 24 moves to the right, the stop pin 26 slides to the left in the slot 46. As the transfer bar 24 continues to move to the right, the lock bar 34 is biased downwardly by the stop pin spring 36. As the lock bar 34 moves downwardly, the indent 38 engages the lock pin 40 therein, thereby securing the stop plate 20 which at the same time, has pivoted upwardly into a vertical position in front of the lift 12.

Changes may be made in the constsuction and arrangement of the parts or elements of the embodiment as disclosed herein without departing from the spirit or scope of the invention as defined in the following claims.

I claim:

1. A safety barrier for a wheelchair lift, the barrier preventing the wheelchair from dropping off the front of the lift as the lift is raised and lowered horizontally, the barrier comprising:

an elongated stop plate pivotally mounted on the front of the lift;

a first and second pivot arm, one end of said pivot arms pivotally attached to the side of the lift, said first pivot arm pivotally attached to one end of a horizontal transfer bar, the other end of said horizontal transfer bar pivotally attached to said stop plate;

an elongated horizontal shoe, the ends of said shoe pivotally attached to the other end of said pivot arms, said shoe disposed below the horizontal surface of the lift, said shoe contacting the ground surface when the lift is lowered, said shoe pivoting said pivot arms when contacting the ground surface and pivoting said stop plate from a vertical position to a horizontal position;

biasing means for biasing said stop plate in a vertical position, said biasing means attached to the side of the lift and said first pivot arm; and a lock bar disposed along the length of said transfer bar, one end of said lock bar pivotally attached to said stop plate, the other end of said lock bar having a cam surface, said lock bar having a "U" shaped indent for receiving a lock pin, said lock pin attached to and extending outwardly from the side of the lift, said indent receiving said lock pin therein when said stop plate is in a vertical position, said transfer bar including a cam pin attached to and extending outwardly therefrom, said cam pin disposed adjacent the cam surface of said lock bar, said cam pin engaging the cam surface when said transfer bar is pivoted thereby pivoting said lock bar upwardly and releasing said lock pin thereby allowing said transfer bar to pivot said stop plate into a horizontal position.

2. A safety barrier for a wheelchair lift, the barrier preventing the wheelchair from dropping off the front of the lift as the lift is raised and lowered horizontally, the barrier comprising:

an elongated stop plate pivotally mounted on the front of the lift;

a first and second pivot arm, one end of said pivot arms pivotally attached to the side of the lift, said first pivot arm pivotally attached to one end of a horizontal transfer bar, the other end of said horizontal transfer bar pivotally attached to said stop plate;

a rod guide attached to the side of the lift;

a rod having a spring mounted therearound, one end of said rod received through an aperture in said rod guide, the other end of said rod pivotally attached to said first pivot arm, said spring biasing said rod for pivoting said stop plate into a vertical position;

an elongated horizontal shoe, the end of said shoe pivotally attached to the other end of said pivot arms, said shoe disposed below the horizontal surface of the lift, said shoe contacting the ground surface when the lift is lowered, said shoe pivoting said pivot arms when contacting the ground surface and overcoming the bias of said spring and pivoting said stop plate from a vertical position to a horizontal position; and a lock bar disposed along the length of said transfer bar, one end of said lock bar pivotally attached to said stop plate, the other end of said lock bar having a cam surface, said lock bar having a "U" shaped indent for receiving a lock pin, said lock pin attached to and extending outwardly from the side of the lift, said indent receiving said lock pin therein when said stop pin is in a vertical position, said transfer bar including a cam pin attached to and extending outwardly therefrom, said cam pin disposed adjacent the cam surface of said lock bar, said cam pin engaging the cam surface when said transfer bar is pivoted thereby pivoting said lock bar upwardly and releasing said lock pin thereby allowing said transfer bar to pivot said stop plate in a horizontal position.

3. The barrier as described in claim 1, wherein said biasing means includes a rod guide attached to the side of the lift and a rod having a spring mounted therearound, one end of said rod received through an aperture in said rod guide, the other end of said rod pivotally attached to said first pivot arm, said spring biasing said rod for pivoting said first pivot arm.

* * * * *